United States Patent
Contractor

(10) Patent No.: US 6,721,406 B1
(45) Date of Patent: Apr. 13, 2004

(54) TELEPHONE CALLER LOCATION DATA RETRIEVAL

(75) Inventor: Sunil H. Contractor, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/996,080

(22) Filed: Nov. 28, 2001

(51) Int. Cl.[7] .......................... H04M 1/56; H04M 15/06
(52) U.S. Cl. .............................. 379/142.06; 379/142.01; 379/142.04; 379/142.1; 379/142.17; 379/88.21; 379/201.08
(58) Field of Search ........................ 379/142.01, 142.04, 379/142.06, 142.1, 142.15, 142.17, 88.11, 88.19, 88.2, 88.21, 207.02, 207.15, 221.14, 220.01, 245, 201.06, 201.07, 201.08; 455/414, 415

(56) References Cited

U.S. PATENT DOCUMENTS

| | | | | |
|---|---|---|---|---|
| 5,457,738 A | * | 10/1995 | Sylvan | 379/93.23 |
| 5,940,484 A | * | 8/1999 | DeFazio et al. | 379/142.06 |
| 6,298,128 B1 | * | 10/2001 | Ramey et al. | 379/142.01 |
| 6,353,664 B1 | * | 3/2002 | Cannon et al. | 379/142.1 |
| 6,449,351 B1 | * | 9/2002 | Moss et al. | 379/142.09 |
| 6,459,782 B1 | * | 10/2002 | Bedrosian et al. | 379/201.08 |
| 6,496,569 B2 | * | 12/2002 | Pelletier et al. | 379/142.01 |
| 6,539,080 B1 | * | 3/2003 | Bruce et al. | 379/88.17 |

OTHER PUBLICATIONS

U.S. Application Ser. No. 09/996,064 entitled: Location ID Service For Telephone Calls.

* cited by examiner

Primary Examiner—Curtis Kuntz
Assistant Examiner—Quoc Tran
(74) Attorney, Agent, or Firm—Merchant & Gould

(57) ABSTRACT

A system for obtaining location data of calling parties for telephone calls provides location data for display by a called device. Through reception of the name, telephone number, or other calling party identifier as is done through the conventional caller ID service, the called device formulates a query to a database containing location data for calling parties. Existing advanced intelligent network infrastructure may be used to provide caller ID data to the called device, and the called device uses this caller ID data to formulate the query to the database. Additionally, the called device may have access to multiple databases containing location data and may detect an appropriate database to query based upon analysis of the caller ID data that has been received.

20 Claims, 4 Drawing Sheets

TELEPHONE CALLER LOCATION DATA RETRIEVAL

TECHNICAL FIELD

The present invention relates to obtaining information about a party placing a call through the telephone system. More specifically, the present invention relates to obtaining location data about a calling party at the called device.

BACKGROUND

Caller ID services are provided by telephone companies to permit a called party to determine who is calling even before answering the call. Caller ID services generally provide a display of the calling party's name and/or telephone number. Called parties may use the caller ID service to screen calls and/or to review the names and numbers for missed calls. Thus, caller ID has become a valuable feature of telephone service.

Often, it is also desirable for the location of a caller to be known by the called party. This is especially true in emergency situations. For this reason, automatic location identification (ALI) has been instituted for 911 service so that a calling party's location is provided to the 911 service being called. This enables the 911 service to dispatch assistance to the calling party's location without relying on the calling party to verbally provide the location information. However, the ALI database is accessible only by public safety answering points for 911 services and is inaccessible for non-911 telephone calls.

Other called parties may also benefit from knowing the calling party's location without relying on verbal communication. For example, a poison control center may be called, rather than 911, by a parent in response to a child ingesting a harmful substance. The situation may warrant dispatching emergency personnel to assist the child, but the location of the child must be learned by the poison control center before emergency personnel can be dispatched.

Therefore, there is a need for a system that obtains location data of a calling party for display to a called party for non-911 telephone calls.

SUMMARY

Embodiments of the present invention address the problems discussed above and others by providing a system that functions independently from the 911 ALI service to provide location data of calling parties to called parties. The system provides the location of the device used by the calling party to the device used by the called party by providing the called device with automatic access to one or more electronic databases containing location data for the calling parties. This allows the called party to obtain the calling party's location without relying upon verbal communication. Embodiments of the present invention may be implemented through an advanced intelligent network (AIN) capable of transferring an identifier of the calling party to the called party, where the called device uses the identifier to find the location data.

To provide the identifier to the called party, a signal switching point (SSP) for the called party receives a call trigger that includes an identifier of the calling party, such as the calling party's telephone number. The SSP forwards the identifier to the called device. In response to receiving the identifier, the called device generates a query containing the identifier, which is sent to an electronic database, such as a local or web server database, a mapping system or other geographic informational system, or other database containing the location data. The electronic database looks-up the identifier to obtain the location data and forwards it back to the called device for display. The called party learns the location of the calling party from the display of the location data.

The SSP for the called party may provide the name of the calling party to the called party, rather than a raw identifier such as a telephone number, so that the device can use the name to find the location data. In this case, the SSP generates a query containing the calling party's identifier and delivers it to a signal transfer point (STP). The STP then forwards the query to an appropriate signal control point (SCP). The appropriate SCP has access to a database containing name information for the calling party, which is indexed by the calling party's identifier. For example, the database may be the conventional CNAM database that contains caller ID data. Once the SCP has found the calling party's name in the database, the SCP delivers the name data to the STP which forwards the name data to the SSP. The SSP sends the name data to the called party's device.

When the called device receives the identifier, either as a telephone number or name of the calling party, the called device may additionally detect an appropriate database to query based upon the identifier. The identifier may indicate a calling party who falls into a particular category, and the called device may then query the electronic database that contains location data for calling parties of that category, for example family members as opposed to business contacts.

The various aspects of the present invention may be more clearly understood and appreciated from a review of the following detailed description of the disclosed embodiments and by reference to the drawings and claims.

DETAILED DESCRIPTION

Figure 1:
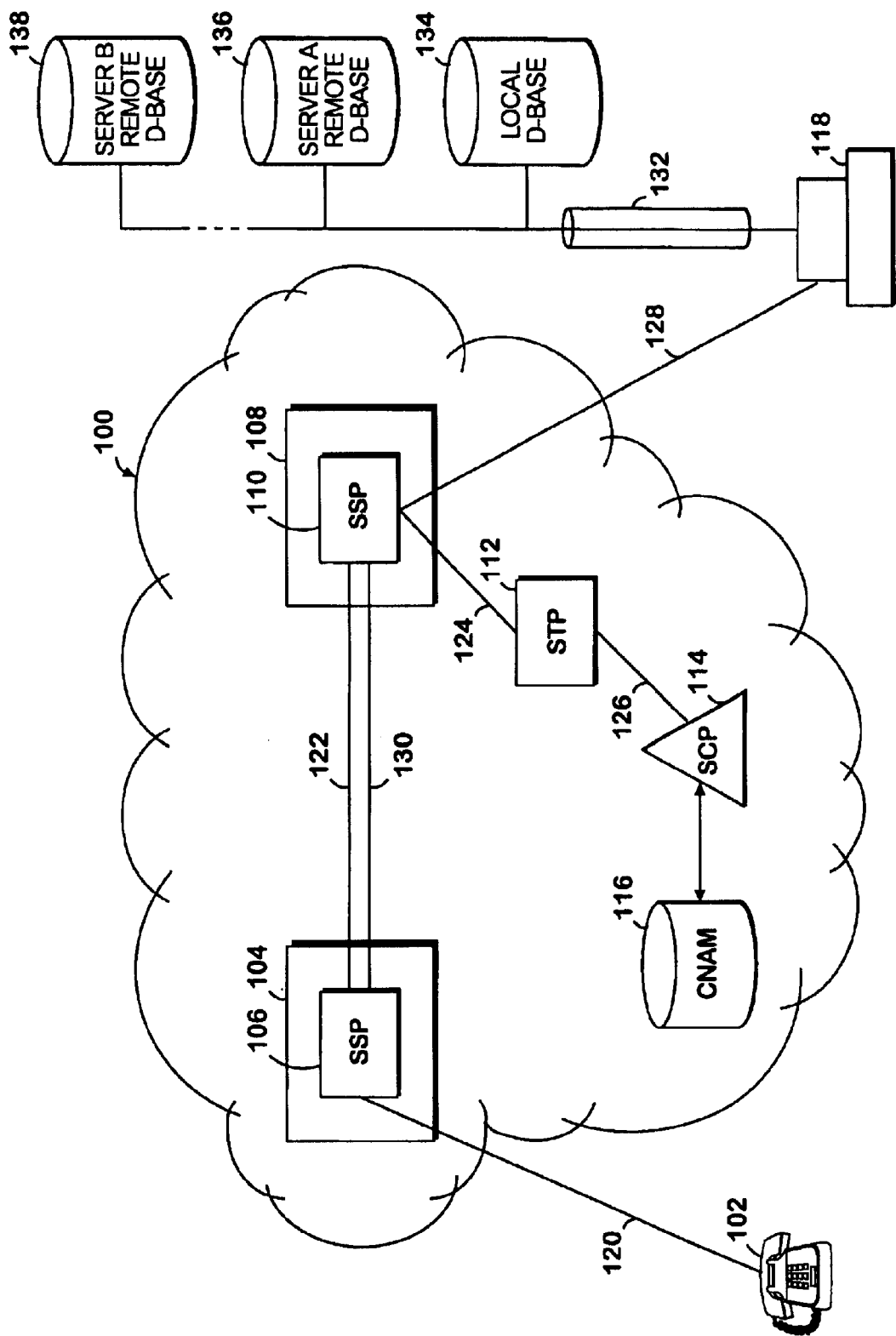
FIG. 1 shows exemplary telephone and database systems for implementing an embodiment of location data services.

In FIG. 1, a telephone system is shown that employs an AIN 100. The AIN 100 is a telecommunications switching network that utilizes the well-known SS7 protocol to connect switching centers and other telecommunications resources to provide call routing and various other services. Essentially, the AIN 100 is a collection of telecommunications components and interconnections that support the generation of AIN messages known as triggers and enable the components to respond to generated triggers by generating responsive messages or by executing an associated instruction.

A conventional voice line telephone 102 is connected to the AIN 100 through a telephone line 120. Telephone line 120 leads to a Central Office 104 that maintains a switch known as an SSP 106. The SSP 106 may have a plurality of subscriber lines connected to it, such as the telephone line 120 establishing wireline telephone service. Likewise, a voice line telephone or other voice line capable device such as a computer 118 may be linked to another central office 108 and SSP 110 through a telephone line 128. The AIN can have an indefinite number of SSPs 106, 110.

The SSPs 106, 110 communicate with each other over an SS7 protocol data communication link 122 which may be established through an STP, such as but not necessarily STP 112, which routes the data packets between the SSPs 106, 110. AIN messages may be passed between SSPs 106, 110 through the communication link 122, and these messages may include data such as the calling party's telephone number or other identifier. Voice connections between SSPs 106, 110 are established through a voice trunk 130 which carries the voice communication that occurs between the two end devices 102, 118.

A data communication link 124 is used to connect an SSP 110 to an STP 112. The STP 112 selects an appropriate SCP 114 to route the message from the SSP 110, such as in relation to the calling party's identifier. Messages are delivered from the STP 112 to an appropriate SCP 114 through a data communication link 126. The SCP 114 then responds to the message from the SSP 110 with a responsive message. The responsive message travels back to the STP 112 and then back to the SSP 110.

Much of the intelligence of the AIN 100 used to switch calls and provide other telecommunications services resides in the SCP 114. As is known to those skilled in the art, SCPs 114 were initially integrated into the AIN 100 to handle message translations and billing transactions for the implementation of 800-number services. An 800 number subscriber has at least one telephone number that can be called by a telephone user. Because there is no physical Central Office or geographic area that corresponds to the 800-area code, it is more economical to provide a few central locations at which a lookup of the directory number for an 800 call can be made. SCPs 114 may have associated databases for directory numbers corresponding to functional 800 numbers.

SCPs 114 also may have databases that contain additional data for enhanced telecommunications services such as caller ID. For example, the CNAM database 116 contains the name corresponding to the telephone number of a calling party. This name can be provided to a called party from the CNAM database 116 when ringing the called party's telephone device 118. Additionally, SSPs and/or SCPs may be used to track the services to be provided to a particular subscriber line, such as whether or not a particular subscriber line has caller ID service.

In summary, the AIN 100 is a complex, high-speed, high call volume, packet-switched messaging system that provides a great deal of versatility in the handling of telephone calls. The SSP 106, 110 can generate a message to the SCP 114 in response to the notification of an incoming call, or call trigger, and then wait for a response from the SCP 114 before proceeding with call processing. More detailed information regarding the AIN 100 can be found in U.S. Pat. No. 5,430,719, which is commonly assigned to BellSouth Intellectual Property Management Corporation and is incorporated herein by reference.

In the example of FIG. 1, a user of the telephone 102 can ring another telephone or equivalent computing device 118 by dialing a directory number associated with the telephonic device 118. A voice link can be created between the calling telephone 102 and the called device 118, if the called device 118 answers in response to the ring. In addition to creating the voice link between the calling device 102 and called device 118, the additional services such as caller ID may be provided.

The called device 118 may be a computer interfaced to the telephone network 100 and having telephone emulation abilities including caller ID data reception and display. The called device 118 may have access to various storage mediums such as an electronic database system including databases 134, 136, and 138 that maintain location data for calling parties. Generally, the called device 118 may access the electronic databases 134, 136, and 138 through a communication medium 132, such as the Internet, a local area network (LAN), and/or through an interface to a local disk drive of the called device 118. For example, the local hard drive of the device 118 may maintain database 134 while a server accessible through a LAN connection maintains database 136 and while a webserver accessible through the Internet maintains database 138.

Figure 2:
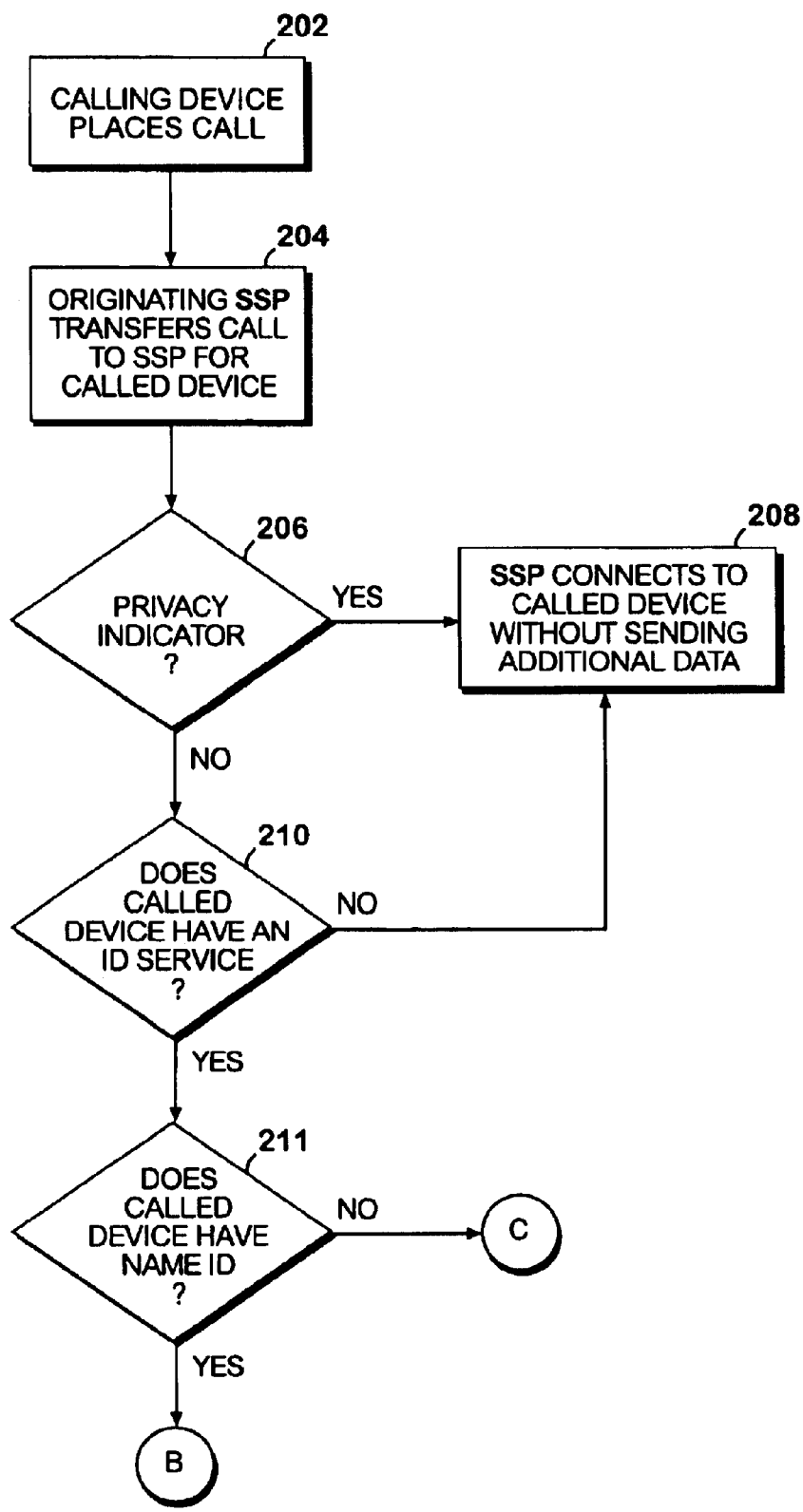
FIG. 2 is a first portion of an exemplary operational flow implemented within the telephone and database systems of FIG. 1.

FIG. 2 shows a first portion of an exemplary operational flow involving the telephone network 100 and the database system of FIG. 1 that allows the called device 118 to obtain location data for the calling party. The operational flow begins at call operation 202 where a calling party places a call from calling device 102. An originating SSP 106 transfers the call to the SSP 110 of the called device 118 at transfer operation 204. The SSP 110 then detects whether the calling party has a privacy service by detecting whether the transferred message from the originating SSP 106 includes a privacy indicator. If a privacy indicator is present, then the SSP 110 connects to the called device 118 to complete the call to the calling device 102 without sending additional data at connect operation 208. Therefore, in this case, the called device 118 cannot obtain the location data because no identifier data has been received that can be looked up in the associated database.

If query operation 206 detects that a privacy indicator is not included in the message transferred from the originating SSP 106, then at query operation 210 the SSP 110 or an SCP, such as but not necessarily SCP 114, that is associated with the called party refers to service tables to detect whether the called device 118 subscribes to a caller ID service. If the called device 118 does not subscribe to a caller ID service, then the SSP 110 connects to the called device 118 to complete the call to the calling device 102 without sending additional data at connect operation 208. If query operation 210 detects that the called device 118 has a caller ID service, then operation flow transitions to query operation 211. At query operation 211, the SSP 110 or SCP associated with the called party again refers to service tables to detect whether the called device 118 subscribes to a calling name caller ID service that provides the name of the calling party to the called device 118 rather than just the telephone number.

Figure 3:
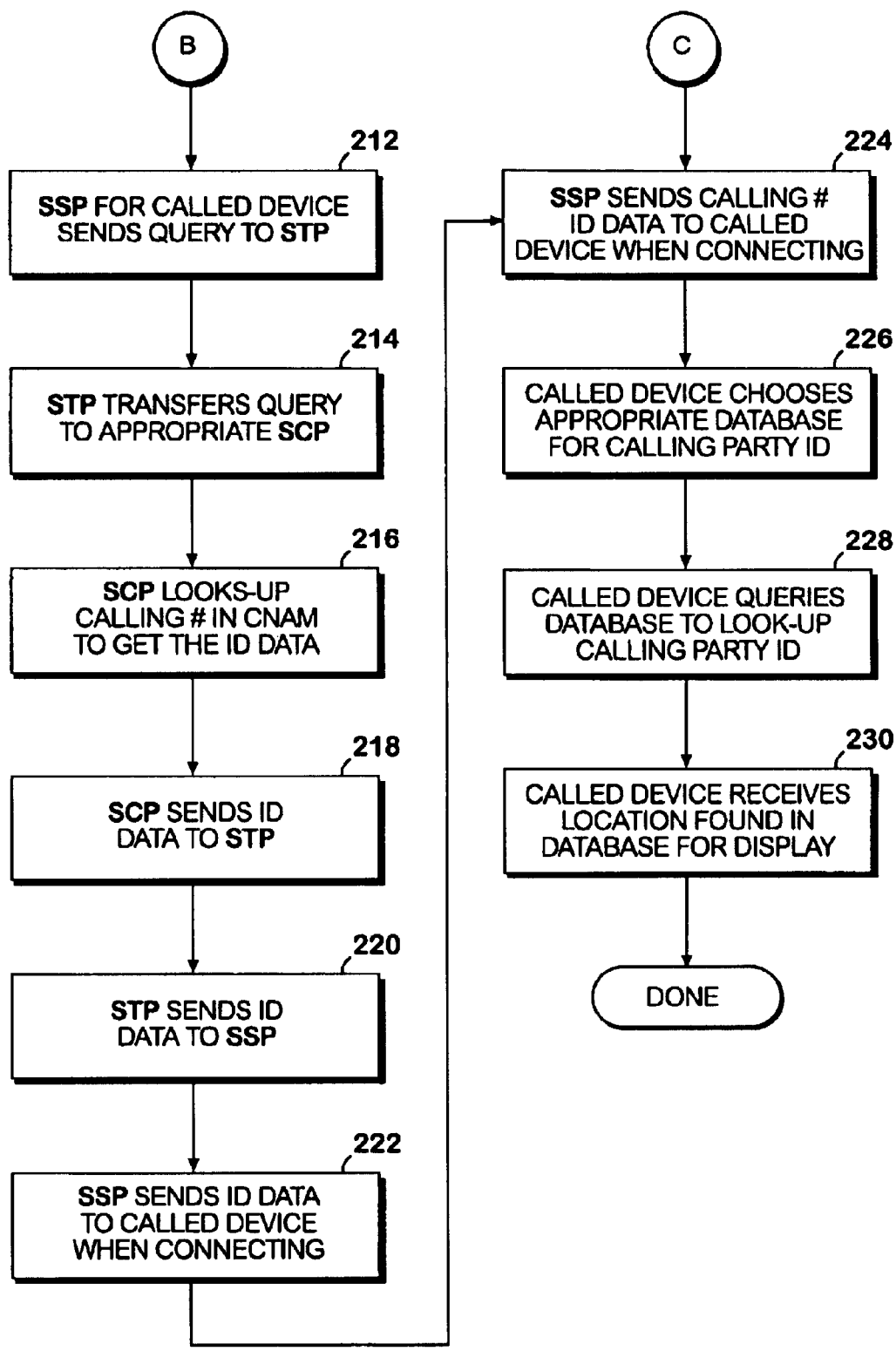
FIG. 3 is a second portion of the exemplary operational flow.

If the called device 118 has subscribed to calling name caller ID service, then at send operation 212 of FIG. 3, the SSP 110 sends a query to the STP 112 that includes the identifier of the calling party transferred from the originating SSP 106. The STP 112 then transfers the query to the appropriate SCP 114 having access to a CNAM database 116 with name data for the calling party at transfer operation 214. The SCP 114 looks up the identifier, such as the telephone number, of the calling party in the CNAM database 116 at data operation 216.

Once the SCP 114 has retrieved the name data for the calling party, the data is transferred back to the STP 112 at send operation 218. The STP 112 then sends the name ID data to the SSP 110 at send operation 220. The SSP 110 then forwards the name ID data to the called device 118 when connecting the call from the calling device 102 at send operation 222. Operational flow then transitions to send operation 224.

If query operation 211 detects that the called device 118 does not subscribe to calling name caller ID service but merely calling number caller ID service, then operational flow transitions directly to send operation 224 from query operation 211. Furthermore, no name data is sent from the SSP 110 to the called device 118 when connecting the call. At send operation 224, the SSP 110 transfers the telephone number of the calling device received from the originating SSP 106 to the called device 118 when connecting the call from the calling device 102.

Once the called device 118 has received the name and or telephone number data of the calling device 102, the called device 118, at selection operation 226, analyzes the data to choose an appropriate database for the ID data that has been received. Selection operation 226 may be eliminated, such as where only a single database with location data is accessible by the called device 118. However, when multiple databases with location data are accessible, the called device 118 may choose the database to query based upon the identifier data that has been received to determine a category for the calling party.

Figure 4:
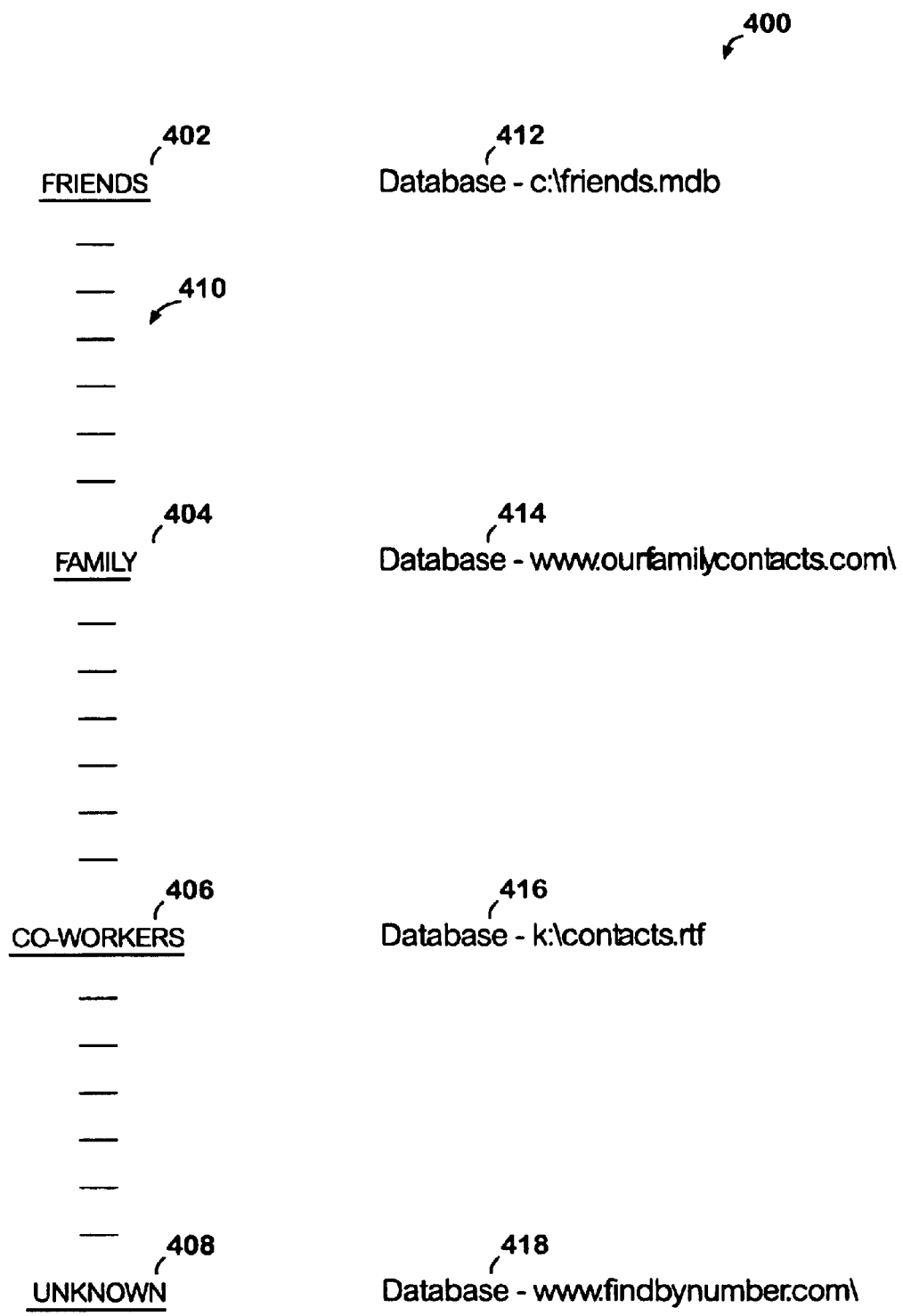
FIG. 4 is an example of a database table utilized by the called device to obtain location data from an appropriate database.

FIG. 4 shows an example of a category list 400 that may be maintained by the called device 118 and may be referenced by the called device 118 when detecting the appropriate database to query at selection operation 226. The category list 400 may be divided into various categories. For example, in a personal context unlike the previous poison control example, the list may be divided up to include a friends category 402, a family category 404, a co-workers category 406, and an unknown caller category 408. For each category, the list 400 includes a sub-list 410 of the calling parties by name and/or telephone number depending upon the type of caller ID service subscription, and the sub-list 410 has data that matches the ID data provided to the called device 118 from the SSP 110.

The called device 118 may choose the appropriate database to query by first determining which category the calling party falls into based on the comparison of the calling party ID data to the data in the sub-lists 410. Once the appropriate category is found, the called device 118 references the category list 410 to find the database address such as the friends database address 412, family database address 414, co-workers database address 416, and unknown callers database address 418. The database addresses may have various forms, such as a local drive and filename, a worldwide-web address, and/or a LAN drive and filename.

Once the called device 118 has chosen the appropriate database to query, the query is sent at query operation 228 from the called device 118 to the database. The query includes the caller ID data received from the SSP 110. In response to the query, the database performs a look up of the caller ID data to find the location data corresponding to the ID data of the calling party. The called device 118 then receives and displays the location data of the calling party at data operation 230. The called party can now perceive the location data along with the identification data of the called party from the display screen or other form of annunciation provided by the called device 118.

Therefore, called parties can obtain the location of calling parties using the existing caller ID services in conjunction with one or more location information databases accessible by the called device. Telephone ordering/delivery services, such as food delivery, who use such called devices can thereby determine the proper route to deliver the ordered goods without receiving verbal instruction from the caller. Likewise, emergency services other than 911, such as poison control centers, can dispatch assistance to the location of the calling party without verbal instruction from the caller. The location data stored on the databases may be in various forms, such as but not limited to a street address, latitude and longitude planar coordinates, and/or a 9-digit zip code.

To facilitate data transmission of the caller ID and location information beyond the called party's computer terminal, such as to geographic informational system (GIS) software that is externally provided for mapping and other purposes, the caller ID data in the CNAM database and the location data in the additional databases may be encoded in various formats. One example of encoding would be binary coded decimal (BCD), where each decimal number of the 9-digit zip code or planar coordinate is represented by a nibble (4 bits). Other encoding schemes are also applicable.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method for acquiring location data about a calling party at a called device, comprising:

receiving, at the called device, an identifier of the calling party through signals from a connection to a signal switching point;

detecting, at the called device, a particular database to query based on the received identifier from amongst a plurality of databases containing location data about calling parties that are indexed by identifiers; and querying, from the called device, the particular database that is detected to obtain the location data by looking-up the identifier received from the signal switching point to find the associated location data of the calling party.

2. The method of claim 1, wherein the calling party identifier is a telephone number of the calling party.

3. The method of claim 1, further comprising:

receiving a call trigger into an originating signal switching point, the call trigger containing the telephone number;

transferring the telephone number from the originating signal switching point to the signal switching point; and forwarding the telephone number from the signal switching point to the called device.

4. The method of claim 3, wherein the call trigger includes the telephone number of the called device.

5. The method of claim 1, wherein querying the particular database comprises sending from the called device a query across the Internet to a server in communication with the particular database.

6. The method of claim 1, wherein detecting a particular database to query comprises determining, by the called party device, a category representing the calling party from the identifier wherein the particular database that is detected contains information for the determined category.

7. The method of claim 1, wherein the identifier is a name of the calling party, the method further comprising:

sending a query to a signal transfer point from the signal switching point, the query containing a telephone number of the calling party;

transferring the query from the signal transfer point to an appropriate signal control point;

looking-up the telephone number in a database accessible by the signal control point to find the name of the calling party;

transferring the name of the calling party to the signal transfer point from the signal control point;

sending the name of the calling party to the signal switching point from the signal transfer point; and forwarding the name of the calling party from the signal switching point.

8. A system for acquiring location data of a calling party, comprising:

a called device that displays the location data;

a signal switching point configured to forward an identifier of a calling party to the called device;

a category list maintained by the called device and referenced when detecting an appropriate electronic database to query for location data, wherein the calling party identifier forwarded to the called device falls into a particular category within the list that identifies the particular database to query; and a plurality of electronic databases in communication with the called device, each containing location data indexed by identifiers of calling parties, wherein the called device sends a query to the particular electronic database upon receiving the identifier, the query containing the identifier, and wherein the electronic database looks up the identifier to access the location data provided to the called device.

9. The system of claim 8, wherein prior to querying the electronic database, the called device detects a particular electronic database to query based on the received identifier and wherein the called device queries the particular electronic database that is detected.

10. The system of claim 8, wherein the calling party identifier is a telephone number of the calling party.

11. The system of claim 10, further comprising an originating signal switching point that receives a call trigger from the calling device and forwards the telephone number to the signal switching point.

12. The system of claim 11, wherein the originating signal switching point forwards a telephone number of the called party to the signal switching point.

13. The system of claim 9, wherein the called device sends the query to the particular electronic database across the Internet to a server in communication with the particular electronic database.

14. The system of claim 9, wherein the called device detects the particular electronic database by determining a category representing the calling party from the identifier and wherein the particular electronic database that is detected contains location data for the determined category.

15. The system of claim 8, wherein the identifier is a name of the calling party, the system further comprising:

a signal transfer point in communication with the signal switching point, wherein the signal switching point sends an identifier query to the signal transfer point that contains a telephone number of the calling party, and wherein the signal transfer point receives the name of the calling party and forwards it to the signal switching point; and a signal control point in communication with the signal transfer point, wherein the signal transfer point forwards the identifier query to the signal control point and the signal control point looks up the telephone number to find the name of the calling party, and sends the name of the calling party to the signal transfer point.

16. A system for acquiring location data of a calling party, comprising:

a telephone network;

a computing device interfaced with the telephone network, the computing device being configured to receive an identifier of the calling party, detect an electronic database containing location data associated with the identifier, send a query containing the identifier to the detected database in response to receiving the identifier, and display the location data; and a plurality of electronic databases in communication with the computing device, the plurality of electronic databases containing location data for calling parties, the plurality of electronic databases being configured so that the detected electronic database from the plurality of electronic databases receives the query and looks up the identifier to obtain the location data.

17. The system of claim 16, wherein the identifier is the telephone number of the calling party.

18. The system of claim 16, wherein the computing device detects an electronic database by determining a category representing the calling party and selecting an electronic database that contains location data for the category.

19. The system of claim 16, wherein one or more of the electronic databases of the plurality are in communication with the computing device through the Internet.

20. The method of claim 3, wherein the call trigger includes the telephone number of the called device, the method further comprising:

prior to forwarding the identifier contained within the call trigger to the called device, detecting whether the call trigger includes a privacy indicator, and if a privacy indicator is detected, the signal switching point connects to the called device without sending the identifier;

subsequent to detecting the absence of a privacy indicator within the call trigger, detecting whether the called device subscribes to a caller identification service providing a number as the identifier, and if such caller identification service subscription is not detected, the signal switching point connects to the called device without sending the identifier; and subsequent to detecting that the called device subscribes to a caller identification service providing a number as the identifier, further detecting whether the called device also subscribes to a calling name caller identification service providing a name as the identifier, and if such calling name caller identification subscription is detected, the signal switching point connects to the called device and sends both the number and the name.

* * * * *